Jan. 6, 1953     T. C. TAYLER     2,624,562
LIME BURNING APPARATUS AND METHOD
Filed Jan. 31, 1949
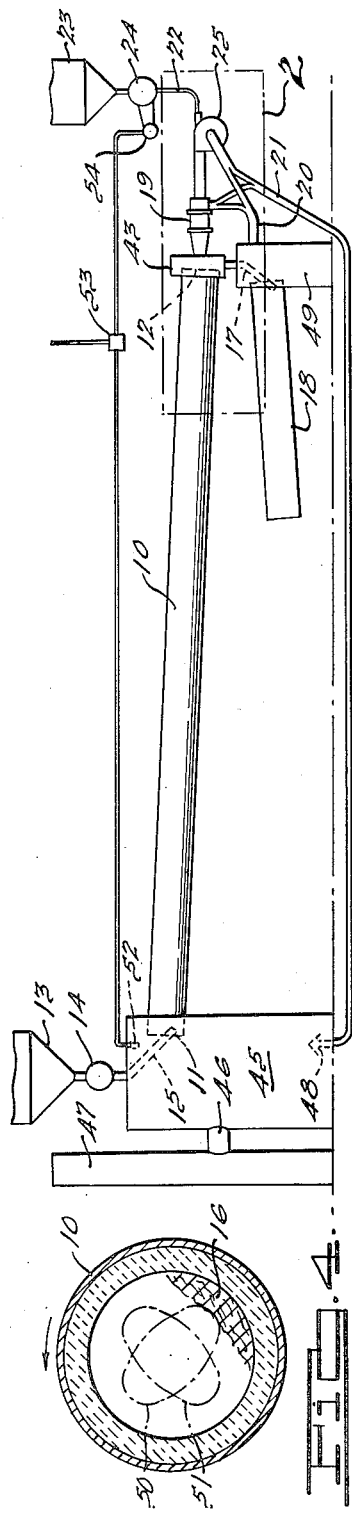
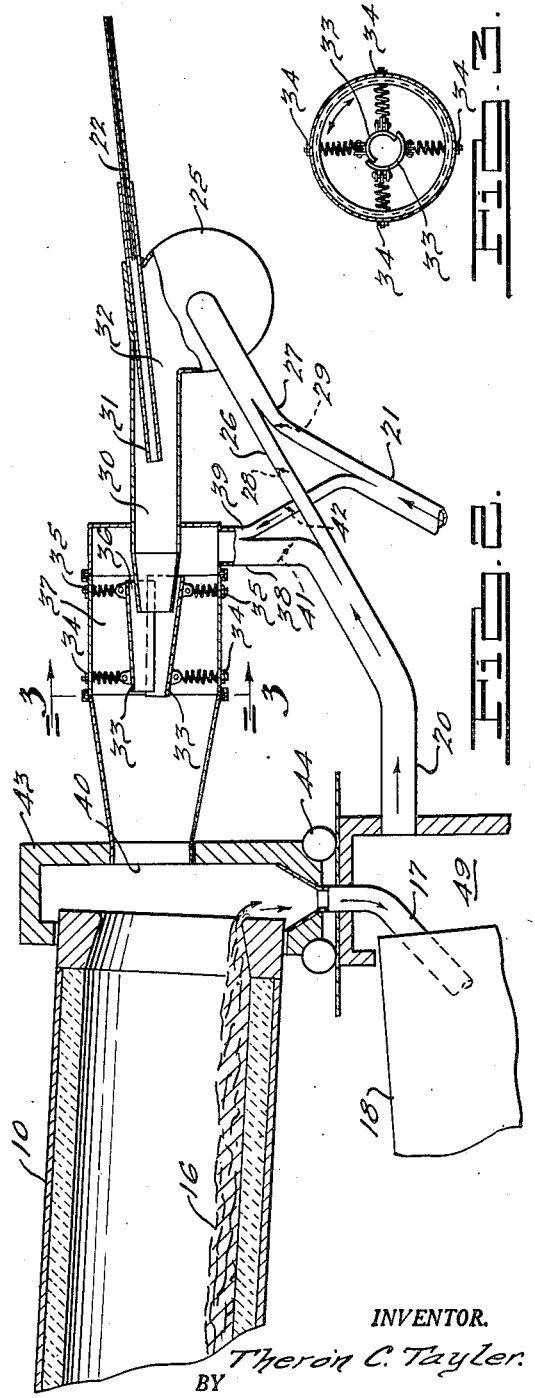
INVENTOR.
Theron C. Tayler.
BY
Harness, Dickey & Pierce.
ATTORNEYS.

Patented Jan. 6, 1953

2,624,562

UNITED STATES PATENT OFFICE 2,624,562

LIME BURNING APPARATUS AND METHOD

Theron C. Tayler, Detroit, Mich.

Application January 31, 1949, Serial No. 73,684

5 Claims. (Cl. 263—53)

This invention concerns a method of applying heat to a thermally decomposable substance in a kiln and with a method and apparatus for controlling flame propagation. It is particularly concerned with a method of calcining limestone in a rotary kiln.

Limestone is calcium carbonate and is normally calcined in a rotary kiln at temperatures above 1550° F. to yield lime and carbon dioxide by the action of a flame introduced at one end of the kiln. The limestone is supplied to the kiln in the form of pebbles or small stones in a quantity sufficient to occupy a small segment of the cross sectional area and the kiln is then rotated causing the limestone to roll, tumble, and slide as it passes through the kiln. As the limestone travels in the rotating kiln, it presents an inclined top surface to the heat of the flame and a bottom surface to the heat of the kiln wall and is progressively heated until a temperature of about 1550° F. is reached and active decomposition begins. The decomposition reaction begins at the surface of each particle and proceeds inwardly.

An analysis of any particular pebble during the course of the calcining would show a central core of limestone and an outer shell of lime or calcium oxide.

It has been the usual practice to supply heat to the kiln at the end opposite the limestone feeding end. A burner is usually mounted at the heat inlet end and hot combustion gases are directed into the kiln against, or countercurrent to, the flow of pebbles. The heat is imparted to the limestone by direct contact with the hot gases, by contact with the hot kiln walls, and by radiation. In the rotary kiln the flame is above the product and direct heat travel is downward, the heat transfer being primarily by radiation.

The supplying of heat to a lime kiln has been a particular and increasingly serious problem in the art as the tendency in the industry has been the adopting of longer and longer kilns. For example, kilns 100 feet long were quite common several decades past whereas it is now the practice to employ kilns 250 to 400 or more feet long. In the earlier kilns, the most intense heat of the flame was normally focused at a point about 15 to 30 feet from the burner end of the kiln; that is, at a point about ⅕ to ¼ along its length. As the kilns became longer, the focus of the heat remained at a point substantially 25 feet from the burner end, representing a distance less than 10% along the length of the new long kilns. This shift in the zone of most intense heat relative to the distance the limestone has traveled in the kiln is extremely important in view of the fact that as the hot zone is shifted relatively closer to the discharge end there is an increasing tendency to supply heat to the finished lime rather than the limestone. This tendency has resulted in a serious overburning of the lime in the conventional kilns. It has been recognized in the art that solutions to this problem must involve a shifting of the hot zone deeper into the kiln. Methods of accomplishing this objective have been adopted but none have proved practical.

For example, it is common practice to extend the end of the burner pipes 5 to 15 feet into the end of the kiln, placing the hottest zone in the best installations about 30 to 40 feet from the discharge end. This gain has, however, proved quite costly because of the extensive damage to the pipes and, consequently, the need for frequent replacement.

It is also common practice to limit the quantity of air admitted with the fuel while supplying secondary sources of air at some point near the flame inlet end of the kiln. The increase in flame length secured by this method was relatively small and, in particular, had little influence on the problem encountered in long kilns.

The anticipated increase in production in the longer kilns has been limited by the above described tendency to overheat the lime as well as by the tendency to overheat the fire brick lining as will be explained more fully later. It has been the history of the industry that yields of lime per cubic foot of kiln space has not kept pace with the increase in kiln length. For example, the increase in length from 100 feet to 400 feet has approximately doubled the kiln output in terms of pounds of lime per day, whereas the kiln length has been multiplied four fold. This, of course, represents a marked reduction in the yield of lime with reference to pounds of lime per cubic foot of kiln space or pounds of lime per linear foot of kiln.

As stated above, the limitation on this production has been the tendency to overheat both the lime and the fire brick lining. In a 400 foot kiln, for example, the limestone will be close to ninety per cent (90%) decomposed at the point of greatest concentration of heat. Any attempt to increase the total amount of heat entering the kiln also serves to increase the temperature in the hot zone and thereby to increase the temperature of the lime in that zone. Because of the fact that the limestone is substantially all decomposed, it has very small capacity to absorb this heat in the carrying out of the decomposition reaction. Thus, much of the heat is used in the raising of the temperature of the lime itself. In this manner, the lime is overburned.

This excessive localized heating not only causes overburning, but causes a substantial loss of heat for the reason that the lime leaves the end of the kiln at an excessive temperature, for example, 2200° F. to 2700° F. where a flame temperature of 2700° F. is being used. It is, of course, possible to recover some of this heat by using it to preheat the inlet gases, but this is an inefficient use since heat coming from a source at a temperature above 1550° F. is most efficiently used in the calcining of additional limestone. In this connection; that is, decomposing limestone; heat emanating from a source above 1550° F. is referred to as "high level" heat. Heat emanating from a source at a temperature less than 1550° F. is referred to as "low level" heat. The total heat available in the calcining system will be a mixture of high and low level heats. Because of the usefulness of high level heat in calcining, its waste is serious even though the percentage of heat lost may be small when calculated in terms of total heat.

The above described tendency to overburn is even more serious with impure limestones such as dolomitic limestones, since they fuse at lower temperatures. These latter limestones are not normally decomposed in rotary kilns except where they are intended for refractory use.

Thus, in the heating methods of the prior art, a great degree of chemical activity occurs up to a distance of about 75 feet from the burner end of the kiln with little activity beyond this point and attempts to extend the point of activity to greater distances from the burner have resulted in overheating of the discharged lime. From a production standpoint, the area of activity should be extended considerably beyond 75 feet and the zone of most intense heat should be about four times as far from the burner end in a 400 foot kiln as it is in a 100 foot kiln in order that the former can equal the latter in production on a cubic foot basis.

A second limitation on the amount of heat which can be applied in any one area involves the nature of kiln lining. For example, the commonly used seventy per cent (70%) magnesia brick fuses at about 2750° F. in the presence of lime. Therefore, in the conventional kiln attempts to increase the flame temperature in an area containing such bricks must be accompanied by attempts to remove heat from the bricks. Thus, efforts have been spent on increasing the heat loss through the refractory lining rather than using insulation to conserve the heat. The heat loss from this source alone may be as high as forty per cent (40%) of the high level heat while only five (5) to fifteen per cent (15%) of the total heat.

Again it may be pointed out that it is the loss of high level heat which constitutes the serious problem. Since it is high level heat which is used in calcining, its effective use is related directly to the thermal efficiency of the kiln.

The heat loss in conventional practice through the failure to use insulation and the loss of high level heat in the discharged lime reduces the overall thermal efficiency of the average rotary kiln to about twenty (20) to thirty-five per cent (35%).

An additional problem incidental to the focusing of heat in a narrow zone close to the point of lime discharge in a rotary kiln is the formation of slag. Silica, and other impurities in the lime and fuel tend to fuse and adhere to the hot walls and build up slag rings of a depth sufficient to retard the flow of limestone and lime through the kiln.

It is an object of this invention to provide a novel method of flame propagation.

It is an object of the invention to produce a uniform and high quality lime from limestone of any analysis including dolomitic limestone.

It is an object to increase the capacity or yield of lime kilns.

It is an object of this invention to maintain in a rotary kiln for the calcination of limestone constant temperatures, a constant draft, a constant kiln rotative speed and a constant limestone feed while providing for automatic control by reducing the variables in the operation of such a kiln to a single controllable variable.

It is a further object of the invention to provide a burner apparatus adapted to the use of a variety of fuels and adapted to distribute a flame over a relatively great distance along the length of the kiln and to focus the greatest intensity of heat in a relatively long zone from 50 to 150 feet or more from the burner and at a point where the limestone is capable of absorbing a substantial proportion of the heat for the decomposition reaction.

It is an object to conserve high level heat for calcination and to operate with a minimum of waste heat and consequently with a high thermal efficiency, without adversely affecting lime quality.

It is an object to eliminate or minimize slag formation.

It is an object to make possible higher kiln rotative speeds simultaneously with an increased limestone surface exposed to radiant heat.

It is an object to reduce the heat flow from a flame to the brick lining of a kiln to permit the use of insulation.

I have now found that the foregoing and related objects can be secured in a method which, in the preferred embodiment, comprises a method of calcining limestone wherein limestone is introduced into an inlet end of a kiln and discharged from an outlet end of the kiln and wherein a portion of the kiln is heated to a temperature above the calcination temperature of the limestone by the action of a flame resulting from the contact under ignition conditions of an inner fluid jet and an outer fluid jet; said inner fluid jet comprising a mixture of a combustible fluid, inert gases and a proportion of air insufficient for combustion and being directed into the kiln in a direction substantially parallel with the walls thereof; said outer jet comprising a mixture of air and inert gases and forming a concentric shell around said inner jet; said air being preheated by passing the air in heat exchange with the discharged lime and to a temperature which together with the temperature of the inert gases is sufficient to heat the hydrocarbon portion of the combustible fluid to a temperature to cause cracking; said inert gases being a portion of the hot exit gases from said kiln; and the proportion of said combustible fluid being responsive to the temperature of said exit gases.

A burner assembly for securing the novel method of flame propagation and for carrying out the above method comprises, in its preferred embodiment, an inner chamber; an outer chamber concentric to said inner chamber; a fuel inlet to supply fluid fuel to the inner chamber; an inlet for preheated air adapted to supply air to the inner and outer chambers; an inlet for inert gases adapted to supply inert gases to said inner and outer chambers; a blower mounted opposite the exit end of said burner assembly adapted to direct a fluid jet from said inner chamber into the kiln and in a direction substantially parallel with the walls thereof, two oppositely disposed and rotatably mounted U-shaped vanes comprising the exit end of said inner chamber; and adjusting means in engagement with said vanes to determine the width of the opening formed by said vanes.

Other objects and features of novelty of the invention will be specifically pointed out or will become apparent when referring, for a better understanding of the invention, to the following description taken in conjunction with the accompanying drawings, wherein:

Fig. 1 is a diagrammatic representation of a lime kiln assembly;

Fig. 2 illustrates diagrammatically the details of the burner end of the lime kiln assembly shown in Fig. 1;

Fig. 3 is an end view of the gas exit of the inner chamber of the burner assembly taken along the line 3—3 of Fig. 2; and Fig. 4 shows diagrammatically a cross sectional view of the kiln.

With particular reference to the drawings, Fig. 1 shows a kiln 10 with a limestone inlet end 11 and a lime discharge end 12. A hopper 13 provided with a feeder 14 and a chute 15 is mounted near the inlet end 11 and feeds the limestone 16 into the kiln 10.

A discharge chute 17 is provided at the discharge end 12 of the kiln 10 to carry the discharged lime from the kiln to a lime cooler or heat exchanger 18.

A burner 19 is mounted at the lime discharge end 12 and is provided with an air line 20, an inert gas line 21, and a telescopic fuel inlet line 22, which, as shown, is connected with a fuel supply bin 23 and a fuel feeder 24. A blower 25 is mounted in the rear end of the burner assembly and is provided with an inlet 26 for air and an inlet 27 for inert gases. The air inlet 26 to the blower 25 is provided with a damper 28 and the inert gas inlet is provided with a damper 29 for controlling the proportions of the respective gases used.

The body of the burner 19 consists generally of two concentric chambers. An inner chamber 30 is provided with a fuel inlet 31 and an inlet 32 for an air-inert gas mixture from the blower 25. A rotatably mounted split conical section which consists of two oppositely mounted U-shaped vanes 33 is positioned at the gas exit of the inner chamber 30. Adjustable bolts 34 support one end of the split conical section and adjustable bolts 35 support the other end. Adjustment of the bolts 34 controls the width of the aperture between the vanes 33 and adjustment of the bolts 34 controls the width of an opening 36 between the main body of the inner chamber and the split conical section.

An outer chamber 37 lies concentrically to the inner chamber 30, extends to the entrance of the kiln 10, and is provided with an inlet 38 for air and an inlet 39 for inert gases and with an outlet 40. The air inlet 38 is provided with a damper 41 and the inert gas inlet 39 is provided with a damper 42 to control the proportion of the respective gases used. The outlet 40 of the outer concentric chamber 37 is in engagement with a movable housing 43 for the end of the kiln 10, said housing being mounted on wheels 44 to provide for expansion of the kiln.

A chamber 45 at the limestone inlet end 11 of the kiln 10 serves as a collector of exit gases from the kiln. It is provided with an exit 46 to a stack 47 and with an exit 48 to the pipe 21 which serves to carry exit gases to the burner 19.

Air is preheated and is supplied to the burner 19 by passing it through the lime cooler 18 into an air storage chamber 49 and then through the duct 20, into the blower 25 and into the outer concentric chamber 37 of the burner.

In Fig. 4 there are shown in broken lines two oval sections 50, 51 which illustrate two positions of the oval-shaped flame which can be secured by manipulation of the control vanes 33 shown particularly in Fig. 3. Each of the control vanes 33 may be moved inwardly or outwardly by manipulating bolts 34 to decrease or increase the major diameter of the oval and the conical assembly may be rotated to change the position of the major axis of the oval-shaped flame. In this manner, the major axis of the flame may lie parallel with or perpendicular to the inclined surface of the limestone 16. Other positions can be obtained as desired. It is preferred that the adjustable vanes 33 be so directed that the stream of combustible gas be directed slightly upwardly and substantially parallel to the kiln walls. The forward speed of the gas stream may be altered by changing the speed of the blower and it is preferred that the speed be sufficient to project the two concentric streams of gas an appreciable distance without substantial intermingling. In this manner, the flame may be spread over a distance of from 50 to 150 or more feet.

Referring again to Fig. 1, a temperature measuring device 52 such as a thermocouple and the like is connected through an automatic control 53 to the feed control 54 which controls the fuel feeder 24.

In the operation of calcining limestone in accordance with the method and apparatus of the invention, limestone in the form of pebbles is fed into a rotary kiln by means of a chute connected to a limestone storage hopper. The feed is regulated at a constant rate by the feeder control. An amount of limestone sufficient to fill only a part of the cross sectional area of the kiln is added. As the limestone is rotated and slid toward the discharge end, its temperature is gradually elevated to about 1550° F., at which point decomposition of the limestone begins. Carbon dioxide is then evolved from the limestone, leaving a residue of calcium oxide or lime. The decomposition begins on the surface of each particle and proceeds inwardly in a manner such that at any particular time in the course of the reaction, each particle consists of a central core of limestone and an outer shell of lime. Because of the sliding and tumbling action provided by the rotating kiln, the particles are uniformly heated, the individual particles having substantially the same analysis at the same point in the kiln.

The burner assembly is mounted at the lime discharge end of the kiln and directs a stream of hot combustion gases countercurrent to the stream of limestone pebbles. The fuel for the burner assembly is supplied in the form of a fluid and may be a hydrocarbon gas, a hydrocarbon liquid such as fuel oil or may be coal ground sufficiently fine to be introduced into the burner in fluid form.

Air entering the burner assembly is first passed through the heat exchanger or lime cooler, where it extracts the heat from the discharged lime, and then into an air storage chamber. The preheated air is divided into two streams after it leaves the storage chamber, one of the streams entering the outer chamber of the burner assembly, the other entering the blower to be mixed subsequently with the fluid fuel in the inner chamber. The inert gases which preferably are a portion of the exit gases from the kiln are recycled from the exit chamber and similarly are divided into two streams, one of which enters the outer chamber of the burner assembly and the other enters the blower to be mixed with the fluid fuel and the air in the inner chamber. The recycled inert gases have an average composition of forty per cent (40%) carbon dioxide and fifty-five per cent (55%) nitrogen and have a temperature of about 1500° F.

The fuel is introduced near the center of the inner chamber by means of the telescopic, or otherwise adjustable, fuel inlet line. The telescopic feature provides for adjustment of the entering stream of fuel, since it is desirable that this stream be surrounded with a mixture of air and inert gases. It also provides for the necessary adjustment as the kiln is heated up prior to use and when equilibrium conditions have not been established.

The air is preferably preheated to a temperature of 750° F. or higher and together with a portion of the hot inert gases from the kiln causes the fuel in the inner chamber to be raised to a cracking temperature. The proportion of air supplied to the inner chamber is, however, limited to a degree insufficient to support combustion.

When the proportions of air, inert gas and fuel entering the inner chamber and the proportions of air and inert gas entering the outer chamber have been set to produce a flame of the desired temperature and length, the tip velocity of the gases from the inner chamber and the shape of the flame may be adjusted by means of the vanes 33; that is, by moving the vanes either inwardly or outwardly. Likewise, the conical assembly comprising the exit end of the inner chamber may be rotated to position the flame relative to the limestone surface in any manner desired. Further adjustment is provided by the bolts 35 which control the opening 36. The force of the jet draws the gas mixture of the outer chamber through the opening 36 to form a blanket around the outer periphery of the inner jet. Similarly, the force of the inner jet draws additional gas from the outer chambers as the former is propelled from the exit into the kiln. Normally, the gas will be propelled into the kiln substantially parallel with the walls thereof and as the gas mixture travels forward, the gradual intermingling of the inner and outer streams of gas will cause combustion over a relatively long portion of the kiln, rather than focusing an intense flame in one area.

In this manner, the hot zone of the kiln is longer and occurs at a point where the limestone is substantially undecomposed and has the capacity of absorbing relatively large quantities of heat. Similarly, the lengthening of the hot zone prevents an overheating of the kiln insulation at any one point and, because of the effective reduction in the temperature of the hottest bricks, insulation may be added in order to conserve further the high level heat of the kiln.

The provision for the cracking of hydrocarbon liquids or gases or the volatile portions of solid fuels in the burner assembly of the invention leads to particular advantages of operation. The cracking and subsequent propulsion of the fuel creates an inner jet or pencil of black combustible material within the outer concentric jet of air and inert gases. The nature of the jet, together with the delayed combustion, creates a flame of high luminosity and high heat radiating characteristics. A further advantage and one connected with the fact that the gases are propelled with a high velocity is the turbulence which is set up in the kiln once the two jets have intermingled and combustion has taken place. This turbulence prevents stratification of the gases.

As has been indicated above, the sole variable in the operation of the kiln of the present invention is the fuel input. All other factors such as limestone fed, air fed, inert gas fed, etc., are adjusted at the time the kiln operation is begun and are seldom altered. For example, a heavy rain on an unsheltered kiln may tend to cool the kiln and exit gases unduly and cause certain adjustment to be made. However, under normal operating conditions the fuel input is made responsive to the temperature of the exit gases and is the only variable. In this manner a lowering or raising of the temperature of the exit gases will cause a small increase or decrease, respectively, in the amount of fuel supplied to the burner assembly.

Adjustments for certain improper operating conditions such as the discharge of incompletely decomposed limestone are best made by adjustment of the proportion of inert gases. The proportion of inert gases would, in the example given, be decreased in order to move the flame toward the discharge end. The shortened and more intense flame has an immediate effect on the finished product since more heat is immediately applied to insufficiently heated limestone. As stated above, however, once these adjustments are made the fuel input becomes the only variable in the continuous operation of the kiln.

This method of control, made possible by the present invention, may be contrasted with the cumbersome methods formerly found necessary with the relatively shorter flames. For example, an observation that the limestone was incompletely calcined formerly called for a manual adjustment of fuel input to increase the temperature. This increase in fuel caused an increase in flame length thus moving the area of most intense heat away from the finishing stage of the calcination and therefore having little immediate effect. Conversely, any attempt to reduce the temperature by reducing fuel input caused a shortening of the flame, thus putting the most intense heat in an area where the lime was already overburned. This condition resulted in an unstable operation, with a tendency to swing from overburning to underburning, which is not present in my invention.

I have found that the present method of heating a kiln provides a hot zone about three times as long as the hot zone provided for in the heating methods of the art. Similarly, the present invention can place the focus of heat 50 feet, 75 feet or even 150 feet from the burner end of the kiln in comparison with the 40 feet of the best of the heating methods of the prior art. By this shift in the focal point of the most intense heat, limestone consisting of thirty-five per cent (35%) core may be subjected to the most intense heat as compared to a ten per cent (10%) core of prior methods.

Because of the high thermal efficiency resulting from the use of my invention and, in particular, because of the fact that the flame is placed over limestone with a greater capacity for absorbing heat, I have found that the normal kiln speeds can be increased significantly. In this manner a higher output or great capacity of the kiln is obtained. The higher kiln speed then contributes an accumulative effect to the overall efficiency by causing an increased speed of rotation of the pebbles which, in turn, brings about a more uniform heat transfer to the individual pebbles.

The lengthening of the hot zone has also brought about the incidental but very valuable advantage of minimizing and frequently eliminating slag formation by a spreading of the hot zone and thus avoiding overheated areas. Similarly, the invention permits of the calcination of impure limestones, particularly dolomitic limestones.

The application of the most intense heat to limestone with a capacity for absorbing relatively large quantities of heat, plus the saving of heat through the use of insulation, plus the discharging of lime at a relatively low temperature leads to a high thermal efficiency in the operation of the kiln of the present invention.

It will be apparent that the burner assembly and method of flame propagation herein disclosed and claimed will find uses other than in calcination methods. The apparatus and method will be found useful in any application which requires a spreading of the heat or a focusing of heat at a point quite distance from the burner.

What I claim is:

1. A burner assembly comprising an inner chamber provided with an exit, an outer chamber concentric to said inner chamber and provided with an exit wherein said exits are in alingment for fluid passage therethrough, a fuel inlet member adapted to supply fluid fuel to the inner chamber, an inlet chamber adapted to supply air to said inner and outer chambers, an inlet member adapted to supply inert gases to said inner and outer chambers, a blower adapted to direct a fluid jet through said inner chamber and outwardly from said inner chamber exit and said outer chamber exit, two rotatably mounted U-shaped vanes comprising the exit of said inner chamber, said vanes having their bight portions oppositely disposed to form a hollow truncated cone, the end portions of said U-shaped vanes being adjustable relative to each other to form a variable sized elliptical-shaped exit with the narrow diameter of the said exit being toward the outside relative to said inner chamber, and the large diameter of the opening being adjacent the inner chamber exit, and adjusting means in engagement with said vanes to determine the width of the openings formed by said vanes.

2. A burner assembly adapted to be mounted at the end of a kiln comprising an inner chamber provided with an exit, an outer chamber concentric to said inner chamber and provided with an exit wherein said exits are in alignment for fluid passage therethrough, a fuel inlet member adapted to supply fluid fuel to the inner chamber, an inlet member adapted to supply air to said inner and outer chambers, an inlet adapted to supply inert gases to said inner and outer chambers, a blower adapted to direct a fluid jet through said inner chamber and into the kiln, two rotatably mounted U-shaped vanes comprising the exit end of said inner chamber, said vanes having their bight portions oppositely disposed to form a hollow truncated cone, the end portions of said U-shaped vanes being adjustable relative to each other to form a variable sized elliptical-shaped exit with the narrow diameter of the said exit being toward the outside relative to said inner chamber, and the large diameter of the opening being adjacent the inner chamber exit, and adjusting means in engagement with said vanes to determine the width of the openings formed by said vanes.

3. A method of flame propagation adapted to produce combustion over a relatively long portion of a kiln, which comprises propelling an inner fluid jet into a kiln in a direction substantially parallel with the walls thereof at a high velocity, said inner fluid jet being enveloped with an outer fluid jet having a velocity substantially less than that of said inner fluid jet, said inner fluid jet consisting of a mixture of a combustible fluid, hot inert gases and air in an amount insufficient for complete combustion, said outer jet consisting of a mixture of inert gases and air in an amount sufficient to cause said inner jet to burn progressively along said kiln as the relative velocities of the inner and outer jets intermix the said jets.

4. A method of flame propagation adapted to produce combustion over a relatively long portion of a kiln, which comprises propelling an inner fluid jet enveloped by an outer fluid jet into a kiln in a direction substantially parallel with the walls thereof at a velocity sufficient to project the two concentric streams of gas into the kiln for an appreciable distance without substantial intermingling, said inner fluid jet consisting of a mixture of a combustible fluid, hot inert gases and air in an amount insufficient for complete combustion, said outer jet consisting of a mixture of inert gases and air, said air in said outer jet being present in an amount which when intermixed with the said inner fluid jet will support combustion.

5. A method of calcining limestone comprising the steps of introducing the limestone into an inlet end of a rotary kiln and discharging lime from an outlet end of the kiln; wherein a portion of the kiln is heated to a temperature above the calcination temperature of the limestone by the action of a flame resulting from an inner fluid jet and an outer fluid jet surrounding said inner fluid jet being propelled into the said kiln in a direction substantially parallel with the walls thereof at a high velocity, the velocity of the said inner fluid jet being greater than the velocity of said outer fluid jet and sufficient to project the two said streams of gas into the kiln for a distance sufficient to produce the greatest intensity of heat over a range of from about 50 to 150 feet from the burner end of the kiln, said inner fluid jet consisting of a mixture of a combustible fluid, hot inert gases and air in an amount insufficient for complete combustion, said outer jet consisting of a mixture of inert gases and air in an amount sufficient to support complete combustion when intermixed with said inner fluid jet.

THERON C. TAYLER.

REFERENCES CITED

The following references are of record in the file of this patent:

UNITED STATES PATENTS

| Number | Name | Date |
|---|---|---|
| 798,175 | Ellis | Aug. 29, 1905 |
| 812,786 | Ellis | Feb. 13, 1906 |
| 820,484 | Doherty | May 15, 1906 |
| 824,728 | Larsen | June 3, 1906 |
| 1,101,788 | Doherty | June 30, 1914 |
| 1,213,820 | Bergman | Jan. 30, 1917 |
| 1,244,863 | Kemp et al. | Oct. 30, 1917 |
| 1,297,588 | Pavon | Mar. 18, 1919 |
| 1,332,138 | Newhouse | Feb. 24, 1920 |
| 1,532,041 | Couch | Mar. 31, 1925 |
| 1,629,253 | Breese | May 17, 1927 |
| 2,003,226 | Weller | May 28, 1935 |

OTHER REFERENCES

Page 18, Link Belt Booklet No. 1911, Roto Louver Dryer.